United States Patent
Ishihara et al.

(10) Patent No.: US 7,080,510 B2
(45) Date of Patent: Jul. 25, 2006

(54) EXHAUST GAS SEALING SYSTEM FOR TURBOCHARGER

(75) Inventors: Hiromitsu Ishihara, Okazaki (JP); Kazunari Adachi, Chiryu (JP); Takashi Sakumoto, Kariya (JP); Shinji Kono, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 13 days.

(21) Appl. No.: 10/960,017

(22) Filed: Oct. 8, 2004

(65) Prior Publication Data

US 2005/0079049 A1   Apr. 14, 2005

(30) Foreign Application Priority Data

Oct. 8, 2003   (JP) .............................. 2003-349484

(51) Int. Cl.
*F02D 23/00* (2006.01)
*F02B 37/12* (2006.01)
*F01D 1/00* (2006.01)
*F16J 15/10* (2006.01)
*F16J 15/34* (2006.01)
*F16J 15/38* (2006.01)
*F16K 31/00* (2006.01)

(52) U.S. Cl. .................... 60/602; 415/182.1; 277/390; 277/370; 277/394; 251/14 X

(58) Field of Classification Search ................ 60/602; 415/182.1, 172.1; 277/390, 362, 394, 398, 277/910, 370, 404; 251/14 X See application file for complete search history.

(56) References Cited

U.S. PATENT DOCUMENTS

| | | | | |
|---|---|---|---|---|
| 2,452,352 | A | * | 10/1948 | Booth .......................... 277/394 |
| 2,586,739 | A | * | 2/1952 | Summers ..................... 277/362 |
| 3,604,098 | A | * | 9/1971 | Goldberg ..................... 277/370 |
| 4,343,479 | A | * | 8/1982 | Fukuoka et al. ............. 277/404 |
| 4,363,491 | A | * | 12/1982 | Secor .......................... 277/385 |
| 4,427,204 | A | * | 1/1984 | Alley .......................... 277/390 |
| 4,854,743 | A | * | 8/1989 | Sexton et al. ................ 277/370 |
| 5,148,678 | A | | 9/1992 | Ueda et al. .................... 60/602 |
| 6,880,572 | B1 | * | 4/2005 | Hartley ................... 137/601.05 |
| 2002/0148661 | A1 | * | 10/2002 | Atsuumi ................... 415/182.1 |

FOREIGN PATENT DOCUMENTS

| EP | 0 692 661 A1 | 7/1994 |
|---|---|---|
| EP | 0 972 918 A2 | 7/1999 |

(Continued)

*Primary Examiner*—Thai-Ba Trieu
(74) *Attorney, Agent, or Firm*—Reed Smith LLP; Stanley P. Fisher, Esq.; Juan Carlos A. Marquez, Esq.

(57) ABSTRACT

An exhaust gas sealing system for a turbocharger includes a control valve for controlling a flow of an exhaust gas in a turbine housing, a shaft extending to an outside of the turbine housing through a bearing bore provided on the turbine housing, one end of the shaft being fixed to the control valve, and a sealing member for preventing the exhaust gas from leaking to the outside of the turbine housing through a gap formed between the bearing bore and the shaft. The sealing member includes a through-hole forming a gap with the shaft smaller than a gap formed between the bearing bore and the shaft. One side of the sealing member is pressed against a sealing face and is provided within a cavity formed in the turbine housing and including the sealing face on a peripheral side of the shaft.

3 Claims, 8 Drawing Sheets

FOREIGN PATENT DOCUMENTS

| | | |
|---|---|---|
| EP | 0 972 918 A3 | 7/1999 |
| JP | 5-248253 | 3/1992 |
| JP | 05248253 | 3/1992 |
| JP | 8-334030 | 6/1995 |
| JP | 11315758 A * | 11/1999 |
| WO | WO 2005008041 A1 * | 1/2005 |

* cited by examiner

EXHAUST GAS SEALING SYSTEM FOR TURBOCHARGER

CROSS REFERENCE TO RELATED APPLICATIONS

This application is based on and claims priority under 35 U.S.C. § 119 to Japanese Patent Application 2003-349484, filed on Oct. 8, 2003, the entire content of which is incorporated herein by reference.

FIELD OF THE INVENTION

This invention generally relates to an exhaust gas sealing system for a turbocharger for turbocharging an internal combustion engine.

BACKGROUND

A known turbocharger supplies a turbocharged air to an engine by utilizing energy of an exhaust gas flowing into a turbine housing. In addition, an operating part such as a control valve for controlling the flow of the exhaust gas in the turbine housing is provided in the turbine housing so as to control the boost pressure of the air. Such the operating part is fixed to one end of a shaft extending to an outside through a bearing bore of a bearing provided on the turbine housing and driven from the outside via the shaft.

The temperature of the exhaust gas becomes high (over 800 degrees) and thus a gap is defined between the bearing bore and the shaft in the turbine housing for preventing the burning due to the thermal expansion, thermal deformation, and the like. At the same time, however, the exhaust gas may leak from this gap to the outside (atmosphere) from the turbine housing.

In order to solve the aforementioned drawback, JP08 (1996)-334030A2 discloses an exhaust gas sealing system for a turbocharger. According to the disclosed system, a washer (sealing member) is disposed between an arm supporting the control valve and an end face of the bearing provided in the turbine housing so that the arm and the washer are pressed against the end face of the bearing by the pressure of the exhaust gas applied to the arm. At the same time, the washer and the shaft form no gap therebetween and then firmly become in contact with each other under the high temperature, thereby achieving the exhaust gas sealing system that may reduce the exhaust leaking from the gap between the bearing bore and the shaft. Further, JP05(1993)-248253A2 discloses another exhaust gas sealing system for a turbocharger. According to the disclosed system, a washer (sealing member) engaging with an inner diameter of the bearing bore of the turbine housing and a washer (sealing member) engaging with an outer diameter of the shaft are provided adjacent to each other in the axial direction. Then, a passage through which the exhaust gas leaks is brought to be elongated and bent as a labyrinth, thereby reducing the exhaust gas leaking through the gap formed between the bearing bore and the shaft.

According to the system disclosed in JP08(1996)-334030A2, the valve, the arm and the shaft vibrate in the axial direction due to the engine vibration when the engine is operated. Therefore, it may be difficult to press the arm and the washer against the end face of the bearing provided on the turbine housing by the pressure of the exhaust gas applied to the arm against inertia force generated by the vibration occurring in the valve, the arm and the shaft.

In addition, according to the system disclosed in JP05 (1993)-248253A2, the arm vibrates in the axial direction by the engine vibration when the engine is operated. Therefore, gaps formed between the respective washers may vary in size or shape and thus it may be difficult to surely bring the passage for the exhaust gas like the labyrinth.

Further, According to aforementioned both disclosed systems, the shaft is inclined in the gap between the shaft and the bearing bore due to bias load applied when the control valve is operated. As a result, a gap is formed between the washer and the end face of the bearing, or between the washers, thereby preventing the sealing width or the gap between the washers from being uniformly retained. Furthermore, since the washer and the end face of the bearing, or the washers each other are slid each other when the shaft is rotated along with the operation of the control valve, thereby causing roughness of each surface. The sealing performance may be decreased accordingly.

Thus, a need exists for an exhaust gas sealing system for a turbocharger that can surely reduces the exhaust gas at a high temperature and a high pressure to be leaked from a gap formed between a bearing bore and a shaft in a turbine housing.

SUMMARY OF THE INVENTION

According to an aspect of the present invention, an exhaust gas sealing system for a turbocharger includes a control valve for controlling a flow of an exhaust gas in a turbine housing, a shaft extending to an outside of the turbine housing through a bearing bore provided on the turbine housing, one end of the shaft being fixed to the control valve, and a sealing member for preventing the exhaust gas from leaking to the outside of the turbine housing through a gap formed between the bearing bore and the shaft. The sealing member includes a through-hole forming a gap with the shaft smaller than a gap formed between the bearing bore and the shaft. One side of the sealing member is pressed against a sealing face and is provided within a cavity formed in the turbine housing and including the sealing face on a peripheral side of the shaft.

According to another aspect of the present invention, an exhaust gas sealing system for a turbocharger includes a control valve for controlling a flow of an exhaust gas in a turbine housing, a shaft rotatably disposed within a bearing portion formed on the turbine housing and extending to an outside of the turbine housing through the bearing portion, one end of the shaft being fixed to the control valve, and a sealing member for sealing the bearing portion and the shaft and including a through-hole through which the shaft loosely extends and forming a gap with the shaft smaller than a gap formed between the bearing portion and the shaft. One side of the sealing member is biased by a biasing member provided on the other side of the sealing member and pressed against a sealing face formed on a side of the bearing portion close to the outside of the turbine housing.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
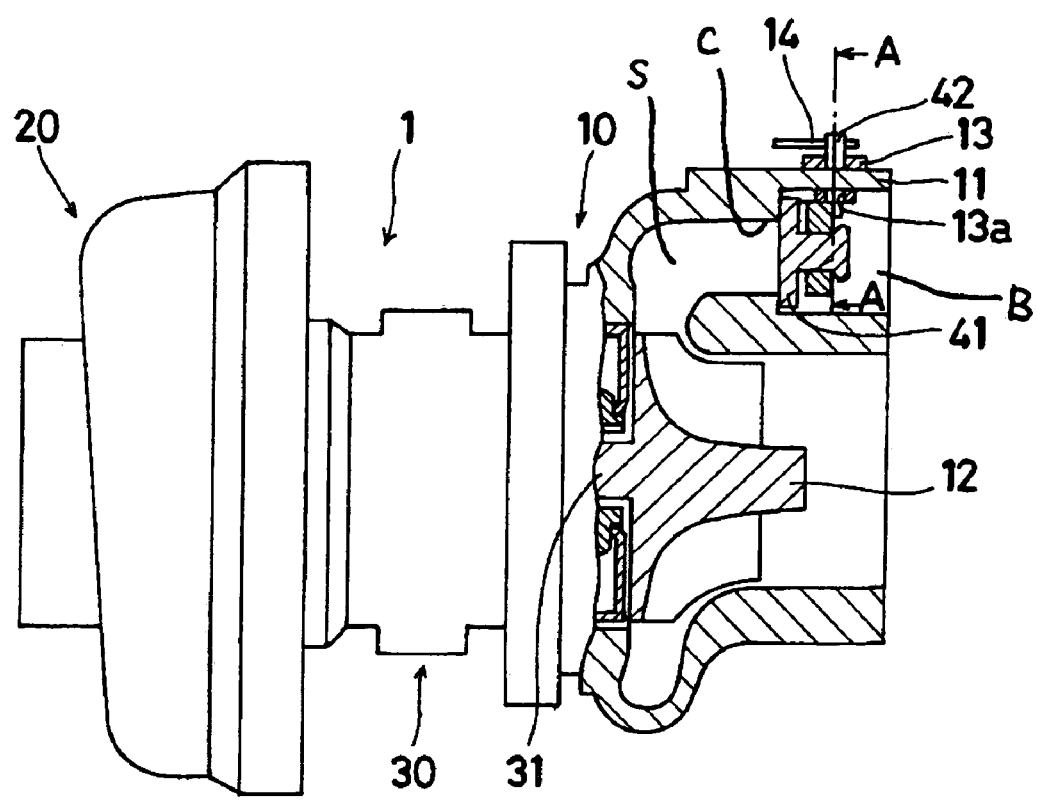
FIG. 1 is a schematic view of a turbocharger including a partial sectional view according to a first embodiment of the present invention.
Figure 2:
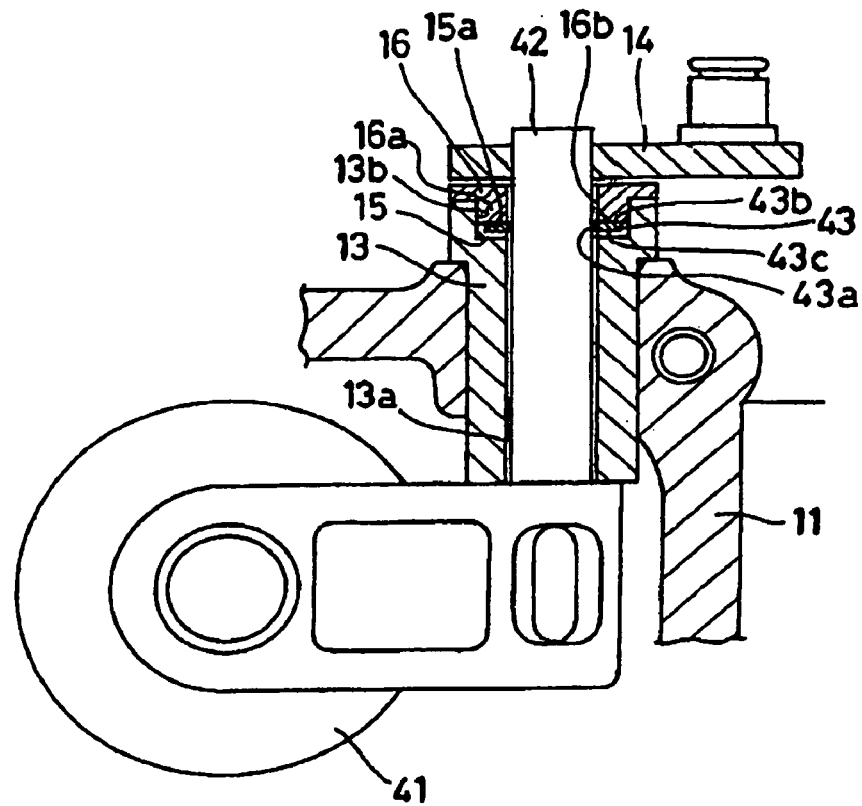
FIG. 2 is an enlarged sectional view of a main portion of an exhaust gas sealing system for the turbocharger taken along a line A—A of FIG. 1.
Figure 3:
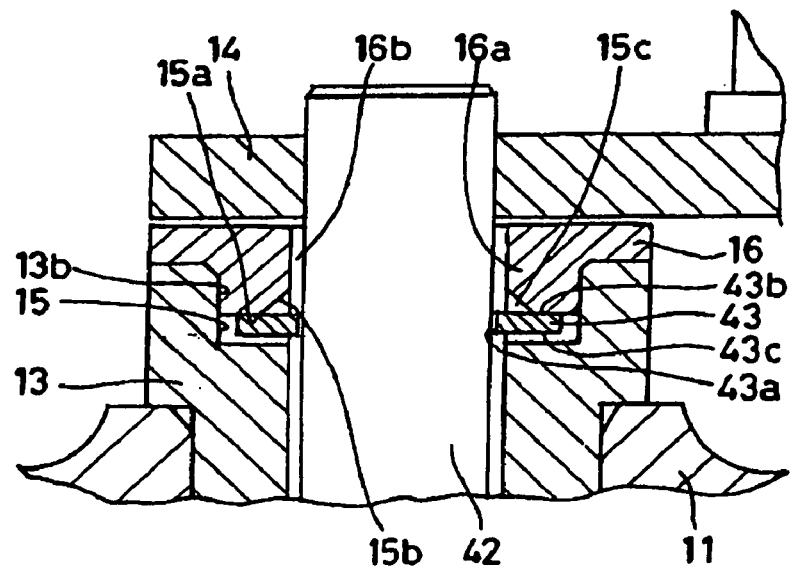
FIG. 3 is an enlarged view of a main portion of FIG. 2.

A first embodiment of the present invention is explained referring to FIGS. 1 to 3. As shown in FIG. 1, a turbocharger 1 includes a turbine portion 10 accommodating a turbine rotor 12 being rotatable by an exhaust gas from an engine (not shown), a compressor portion 20 accommodating a compressor rotor (not shown) rotatable along with the rotation of the turbine rotor 12, and a bearing portion 30 for supporting a shaft 31 that connects the turbine rotor 12 and the compressor rotor each other.

The turbine portion 10 includes a turbine housing 11, a control valve 41 for controlling a flow of the exhaust gas within the turbine housing 11, and the turbine rotor 12 being rotatable by the exhaust gas to be led into the turbine housing 11. The control valve 41 is fixed to one end of a shaft 42. The shaft 42 is rotatably disposed within a bearing bore 13a of a bearing 13 provided on the turbine housing 11. At the same time, the shaft 42 extends to an outside (atmosphere) of the turbine housing 11. A lever 14 is fixed to the other end of the shaft 42. The shaft 42 is rotatable by a drive unit (not shown) via the lever 14 to thereby rotate the control valve 41 fixed to one end of the shaft 42. The control valve 41 being rotated then opens or closes a passage C connecting a scroll portion S and a bypass passage B each other, thereby controlling the flow of the exhaust gas.

As shown in FIGS. 2 and 3, a cover member 16 is also provided on the other end side of the shaft 42 (i.e. relatively close to the outside of the turbine housing 11) being rotatably disposed within the bearing bore 13a provided on the turbine housing 11. In addition, a cavity 15 is defined between the bearing 13 and the cover member 16. The cavity 15 includes a sealing face 15a in a peripheral direction of the shaft 42 and in a direction in which the exhaust gas flows into the outside of the turbine housing 11. The sealing face 15a is also provided on the other end side of the shaft 42. A sealing plate 43 (sealing member) including a through-hole 43a through which the shaft 24 extends is provided within the cavity 15. The through-hole 43a of the sealing plate 43 is provided such that a gap formed between the through-hole 43a and the shaft 42 is smaller than a gap formed between the shaft 42 and the bearing bore 13a. Therefore, the exhaust gas flowing into the gap between the shaft 42 and the bearing bore 13a is squeezed by the through-hole 43a. The pressure at a first side 43c of the sealing plate 43 is higher than that at a second side 43b (which is provided relatively close to the outside of the turbine housing 11). Thus, the sealing plate 43 is pushed towards the second side 43b, i.e. towards the sealing face 15a, within the cavity 15. The second side 43b of the sealing plate 43 is pressed against the sealing face 15a due to the pressure of the exhaust gas applied to the first side 43c, thereby maintaining the airtightness between the sealing plate 43 and the sealing face 15a. In addition, since the sealing face 15a and the sealing plate 43 are provided relatively close to the outside of the turbine housing 11, the influence of temperature of the exhaust gas within the turbine housing 11 on the sealing face 15a and the sealing plate 43 may be reduced, thereby preventing the burning thereof due to the thermal expansion or the thermal deformation, and the like. The gap is formed between the through-hole 43a and the shaft 42 by considering the thermal expansion, the thermal deformation, the inclination of the shaft 42, the dimension tolerance, the geometric tolerance and the like so that the gap is never set to be zero value. As mentioned above, the exhaust gas sealing system is constituted by the cavity 15 including the sealing face 15a, and the sealing plate 43.

The cavity 15 is constituted by the cover member 16 including a convex portion 16a engaging with a concave portion 13b formed on the bearing 13. The sealing face 15a is formed on the cover member 16. In addition, a chamfer 15b is formed on an inner periphery of the sealing face 15a for defining a space 15c being connected to the outside of the turbine housing 11. Since the second side 43b of the sealing plate 43 faces the space 15c, an area contributing the pressure difference of the exhaust gas with the pressure applied to the first side 43c of the sealing plate 43 is increased. Thus, the force for pressing the sealing plate 43 to the sealing face 15a may be increased. A through-hole 16b of the cover member 16 functions as a bearing bore of the shaft 42.

Figure 4:
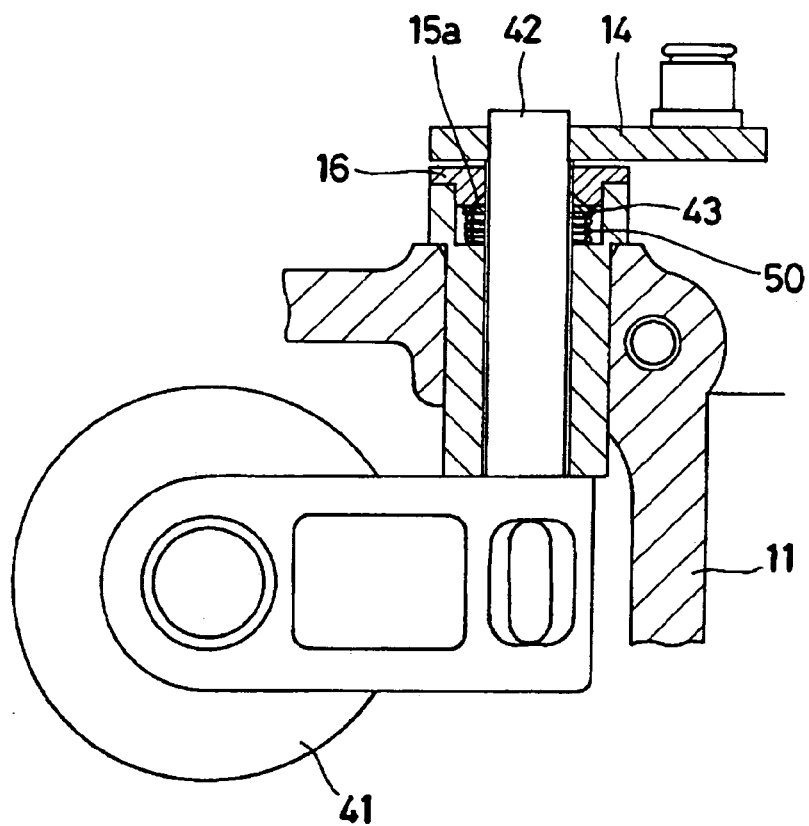
FIG. 4 is a sectional view of a main portion of the exhaust gas sealing system according to a second embodiment of the present invention.
Figure 5:
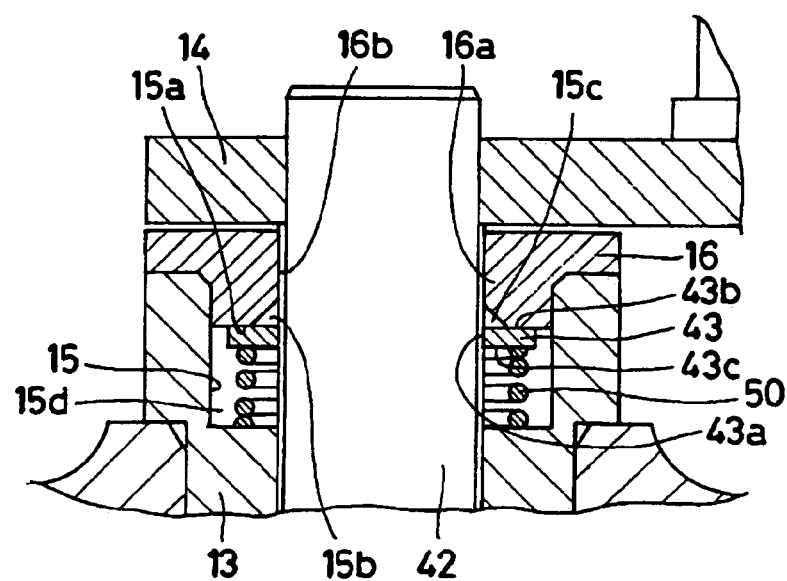
FIG. 5 is an enlarged view of a main portion of FIG. 4.

A second embodiment of the present invention is explained referring to FIGS. 4 and 5. According to the second embodiment, only a spring 50 (elastic member) is disposed between the first side 43c of the sealing plate 43 and the cavity 15 in addition to the structure of the first embodiment. The same parts or components in the second embodiment as those in the first embodiment bear the same numbers thereof and thus the explanation is omitted. In case that the exhaust gas pressure in a space 15d is low, the spring 50 biases the sealing plate 43 so that the force for pressing the sealing plate 43 against the sealing face 15a is increased.

According to the aforementioned embodiments, the control valve 41 functions as a waste gate valve for controlling the flow of the exhaust gas to bypass the turbine rotor 12. However, alternatively, the control valve 41 may function as a flow control valve for controlling the flow of the exhaust gas to be led into the turbine rotor 12.

Figure 6:
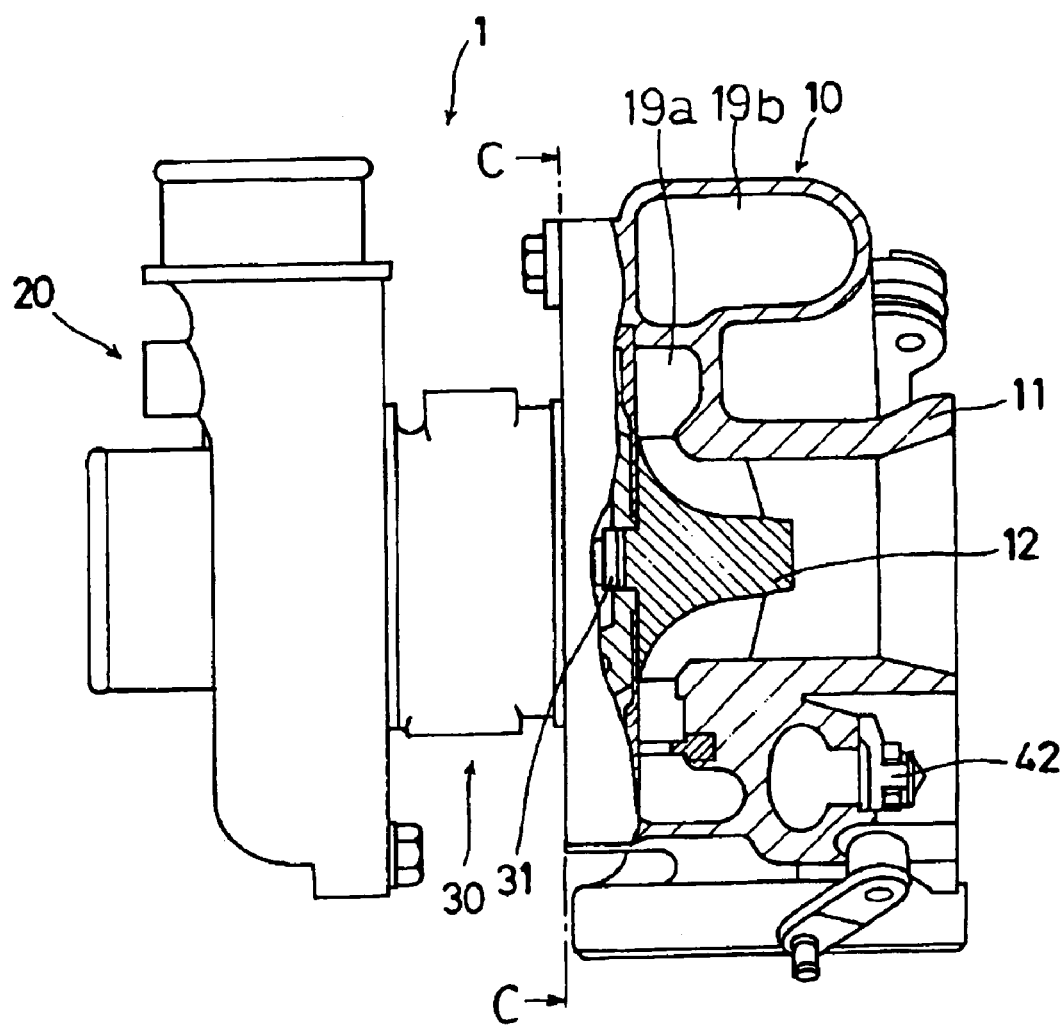
FIG. 6 is a schematic view of the turbocharger including a partial sectional view according to a third embodiment of the present invention.
Figure 7:
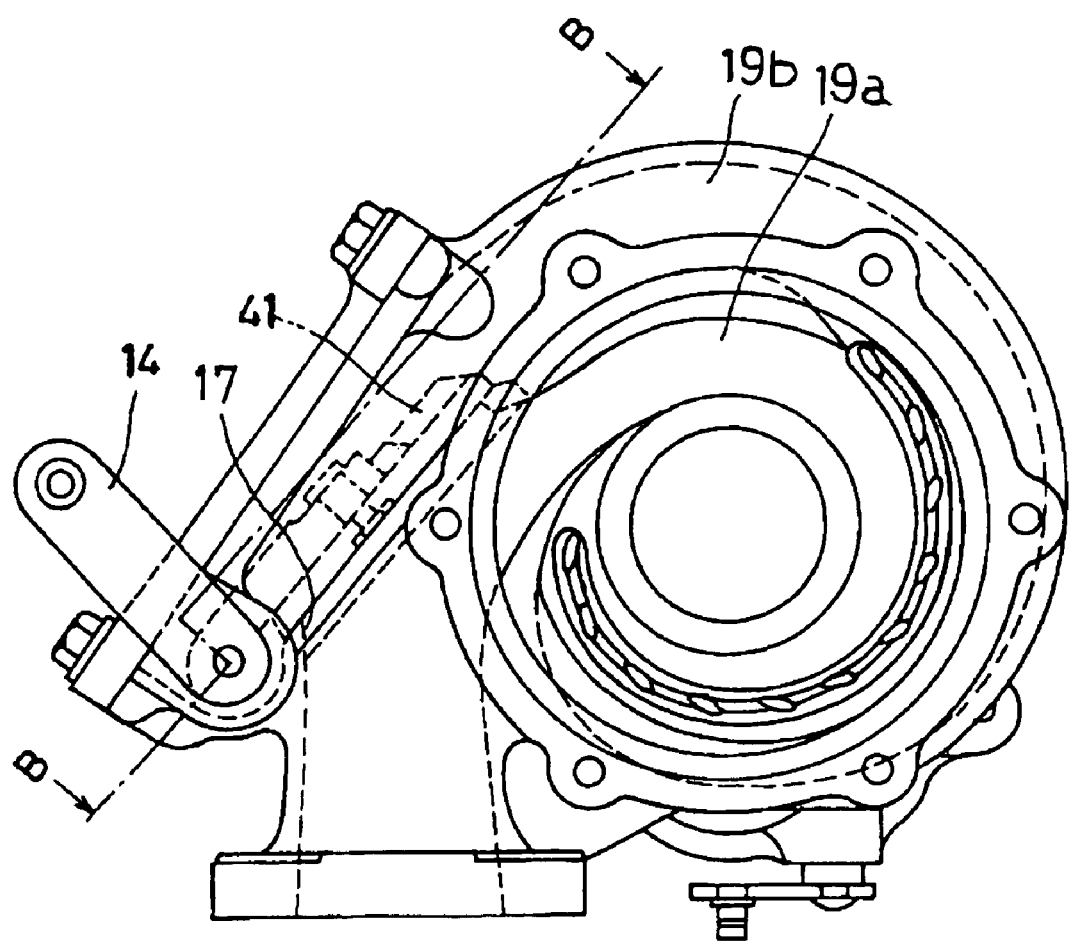
FIG. 7 is a side view of a turbine portion taken along the line C—C of FIG. 6.

Next, a third embodiment is explained referring to FIGS. 6 to 9. As shown in FIG. 6, the turbocharger 1 includes the turbine portion 10 accommodating the turbine rotor 12 being rotatable by the exhaust gas from the engine (not shown), the compressor portion 20 accommodating the compressor rotor (not shown) rotatable along with the rotation of the turbine rotor 12, and the bearing portion 30 for supporting the shaft 31 that connects the turbine rotor 12 and the compressor rotor each other.

The turbine portion 10 includes the turbine housing 11, a flow control valve 41 (control valve) (shown in FIGS. 7 and 8) provided between an internal scroll portion 19a and an external scroll portion. 19b within the turbine housing 11 for controlling the flow of the exhaust gas, an waste gate valve 42 (control valve) for controlling the exhaust gas to bypass the turbine rotor 12, and the turbine rotor 12 being rotatable by the exhaust gas to be led into the turbine housing 11.

Figure 8:
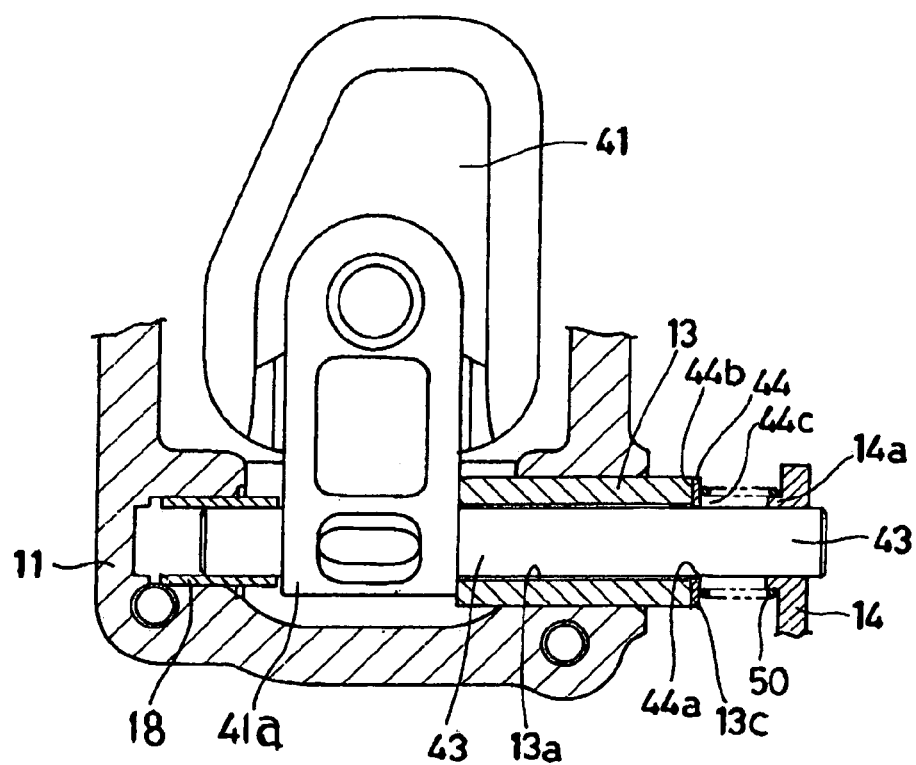
FIG. 8 is a sectional view of a main portion taken along the line B—B of FIG. 7.
Figure 9:
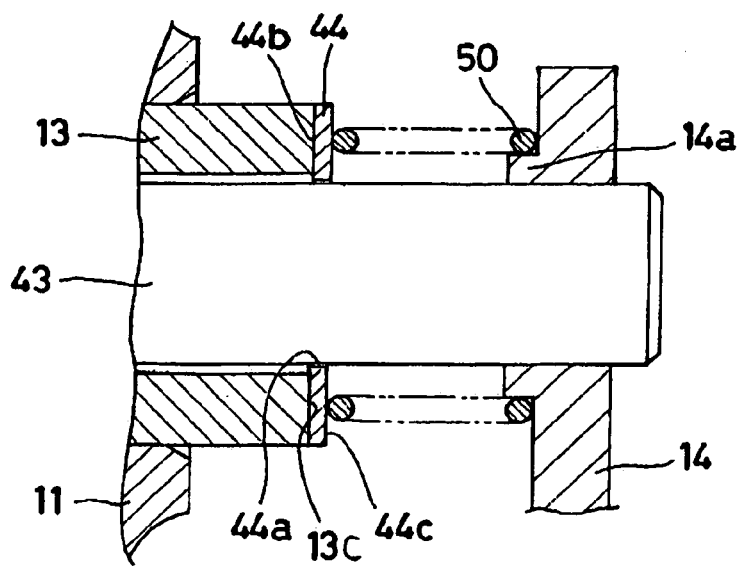
FIG. 9 is an enlarged view of a main portion of FIG. 8.

As shown in FIGS. 8 and 9, the flow control valve 41 is fixed to one end of a shaft 43. The shaft 43 is rotatably disposed within the bearing bore 13a of the bearing 13 formed on the turbine housing 11 and also extends to the outside of the turbine housing 11 (atmosphere) through the bearing bore 13a. The lever 14 is fixed to the other end of the shaft 43. The shaft 43 is driven to rotate by the drive unit (not shown) via the lever 14 to thereby rotate the flow control valve 41 fixed to one end of the shaft 43. The flow control valve 41 being rotated then opens or closes a passage 17 (shown in FIG. 7) that connects the internal scroll portion 19a (shown in FIGS. 6 and 7) and the external scroll portion 19b (shown in FIGS. 6 and 7) in the turbine housing 11. The flow of the exhaust gas is controlled accordingly.

A sealing plate 44 (sealing member) includes a through-hole 44a through which the shaft 43 extends. The through-hole 44a is provided such that a gap formed between the through-hole 44a and the shaft 43 is smaller than a gap formed between the shaft 43 and the bearing bore 13a. A first side 44b of the sealing plate 44 is pushed towards a sealing face 13c formed on the bearing 13, being on a side relatively close to the outside of the turbine housing 11, by the spring 50 arranged on a second side 44c of the sealing plate 44. Thus, the airtightness is maintained between the sealing plate 44 and the sealing face 13c. One end of the spring 50 is secured via an annular projecting portion 14a formed on the lever 14 so that the position of the spring 50 in the radial direction is specified. The interference between the spring 50 and the shaft 43 may be avoided accordingly. The biasing force of the spring 50 for pressing the sealing plate 44 is larger than the pressure of the exhaust gas leaking from the gap formed between the shaft 43 and the bearing bore 13a. At the same time, the biasing force of the spring 50 is determined such that the movement of the sealing plate 44 due to the engine vibration may be sufficiently minimized. One end of the shaft 43 is supported by a bearing 18. An arm 41a for holding the flow control valve 41 is disposed between the bearing 13 and the bearing 18. Then, the axial movement of the shaft 43 is restricted. The sealing plate 44 may be biased by the spring 50 with a predetermined biasing force, thereby assuring the stable sealing performance. In addition, the rotating force of the shaft 43 may be reduced. Since the sealing face 13c, the sealing plate 44, and the spring 50 are provided relatively close to the outside of the turbine housing 11, the influence of temperature of the exhaust gas within the turbine housing 11 on the sealing face 13c, the sealing plate 44 and the spring 50 may be reduced, thereby preventing the burning due to the thermal expansion or the thermal deformation, and the like. The gap is formed between the through-hole 44a and the shaft 43 by considering the thermal expansion, the thermal deformation, the inclination of the shaft 43, the dimension tolerance, the geometric tolerance and the like so that the gap is never set to be zero value. As mentioned above, the exhaust gas sealing system is constituted by the sealing face 13c, the sealing plate 44 and the spring 50.

Figure 10:
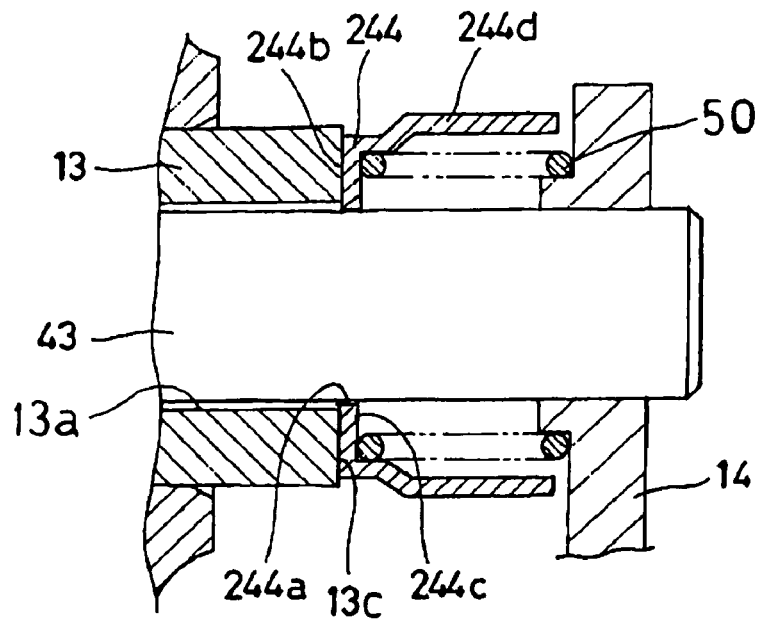
FIG. 10 is an enlarged view of a main portion of the exhaust gas sealing system according to a fourth embodiment of the present invention.

A fourth embodiment of the present invention is explained referring to FIG. 10. According to the fourth embodiment, a cylinder portion 244d is integrally formed on an outer periphery of a sealing plate 244. In addition, the spring 50 is disposed at a radially inner side of the cylinder portion 244d. These structures are only different from the third embodiment. The same parts or components in the fourth embodiment as those in the third embodiment bear the same numbers thereof and thus the explanation is omitted. The sealing plate 244 includes a through-hole 244a through which the shaft 43 extends. The through-hole 244a is provided such that a gap formed between the through-hole 244a and the shaft 43 is smaller than that formed between the shaft 43 and the bearing bore 13a. A first side 244b of the sealing plate 244 is pressed against the sealing face 13c formed on the bearing 13, being on a side relatively close to the outside of the turbine housing 11, by the spring 50 provided on a second side 244c of the sealing plate 244. Thus, the spring 50 is prevented from being damaged due to sticking out to the outside. At the same time, the exhaust gas leaking from the gap between the bearing bore 13a and the shaft 43 in the turbine housing 11 may be surely reduced.

Figure 11:
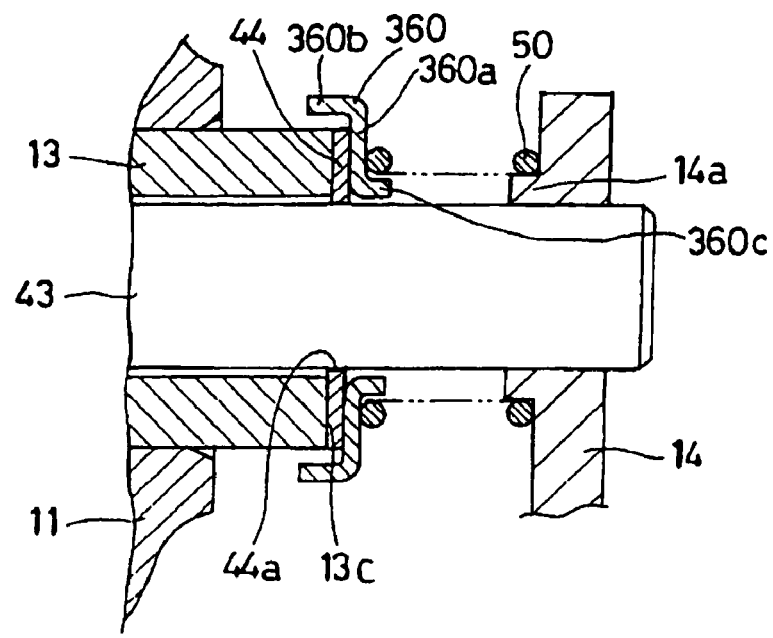
FIG. 11 is an enlarged view of a main portion of the exhaust gas sealing system according to a fifth embodiment of the present invention.

A fifth embodiment of the present invention is explained referring to FIG. 11. According to the fifth embodiment, only a dust cover 360 (first bottomed cylinder member) is disposed between the sealing plate 44 and the spring 50 in addition to the structure of the third embodiment. The same parts or components in the fifth embodiment as those in the third embodiment bear the same numbers thereof and thus the explanation is omitted. A sealing portion where the sealing plate 44 and the sealing face 13c are pressed against each other is provided at a radilly inner side of a first cylinder portion 360b of the dust cover 360 including a first bottom portion 360a through which the shaft 43 loosely extends and whose outer periphery is formed with the first cylinder portion 360b, thereby preventing the dust or dirt from entering into the sealing portion from outside. A projecting portion 360c for specifying a position of the spring 50 in the radial direction is provided on an inner peripheral side of the first cylinder portion 360b.

Figure 12:
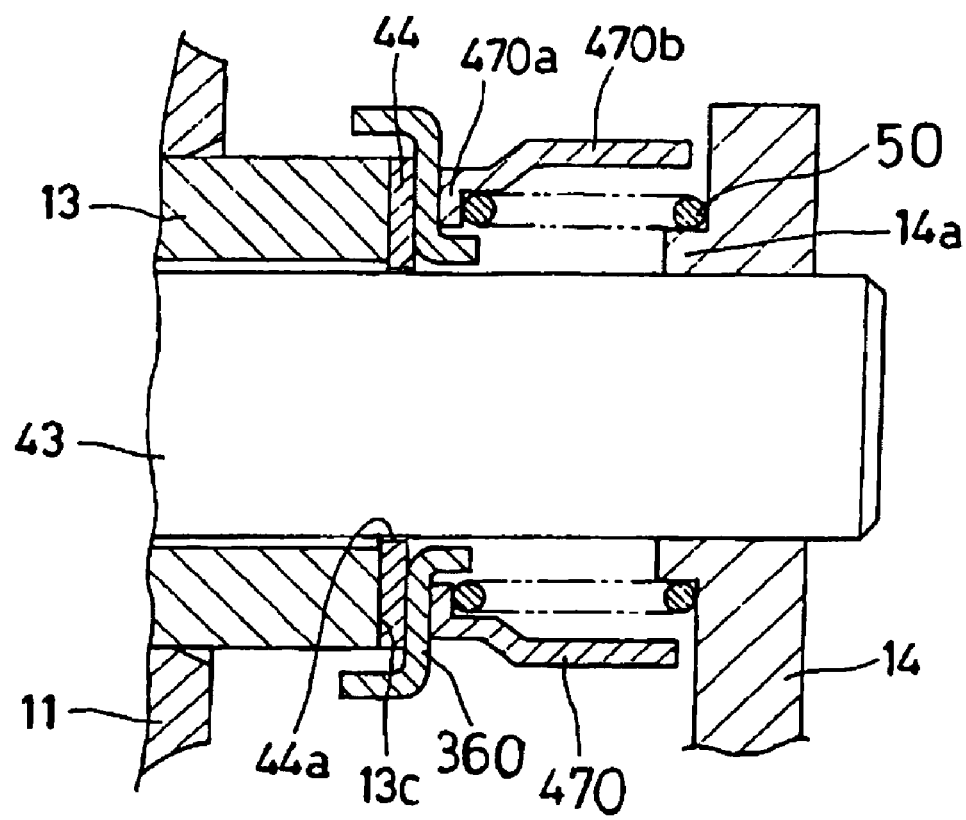
FIG. 12 is an enlarged view of a main portion of the exhaust gas sealing system according to a sixth embodiment of the present invention.

A sixth embodiment of the present invention is explained referring to FIG. 12. According to the sixth embodiment, only a spring cover 470 is disposed between the dust cover 360 and the spring 50 in addition to the structure of the fifth embodiment. The same parts or components in the sixth embodiment as those in the fifth embodiment bear the same numbers thereof and thus the explanation is omitted. The spring cover 470 includes a second bottom portion 470a through which the shaft 43 loosely extends and a second cylinder portion 470b formed at a radially inner periphery of the second bottom portion 470a. The spring 50 is provided on an inner side of the second cylinder portion 470b. Accordingly, the damage caused by the spring 50 sticking out to the outside may be prevented and also the dust or dirt is prevented from entering into the sealing portion from outside.

According to the aforementioned embodiments, the exhaust gas sealing system is employed in the flow control valve 41 for opening or closing the passage 17 that connects the internal scroll portion 19a (shown in FIGS. 6 and 7) and the external scroll portion 19b (shown in FIGS. 6 and 7) in the turbine housing 11 and controlling the flow of the exhaust gas. However, instead, the exhaust gas sealing system may be employed in a waste gate valve for controlling the flow of the exhaust gas to bypass the turbine rotor 12.

In addition, alternatively, the spring 50 may be a disc spring.

Further, according to the aforementioned first and second embodiments, the sealing member 43 reduces the area of the passage for the exhaust gas formed by a gap between the shaft 42 and the bearing bore 13a. In addition, since only the sealing member 43 engages loosely with the shaft 42, the sealing member 43 is not affected by the rotation or inclination of the shaft 42, and the movement of the shaft 42 in the axial direction thereof due to the engine vibration. The sealing member 43 is pressed against the end face of the bearing 13 so as to be in contact therewith to surely reduce the exhaust gas leaking from the gap formed between the bearing bore 13a and the shaft 42.

Furthermore, according to the aforementioned first embodiment, the cavity 15 is constituted by the concave portion 13b formed on the turbine housing 11 and the cover member 16 including the convex portion 16a engaging with the concave portion 13b. Therefore, the cavity 15 may be formed with a simple structure.

Furthermore, according to the aforementioned third embodiment, the sealing member 44 reduces the area of the passage for the exhaust gas formed by a gap between the shaft 43 and the bearing bore 13a. In addition, since the sealing member 44, the sealing face 13c, and the spring 50 are provided relatively close to the outside of the turbine housing 11, the influence of temperature of the exhaust gas within the turbine housing 11 due to the exhaust gas at the high temperature may be reduced, thereby preventing the burning of the bearing bore 13a and the shaft 43 due to the thermal expansion, the thermal deformation, and the like. Further, the exhaust gas leaking from the gap between the bearing bore 13a and the shaft 43 in the turbine housing 11 may be surely reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. An exhaust gas sealing system for a turbocharger comprising:
    a control valve for controlling a flow of an exhaust gas in a turbine housing;
    a shaft rotatably disposed within a bearing portion formed on the turbine housing and extending to an outside of the turbine housing through the bearing portion, one end of the shaft being fixed to the control valve;
    a sealing member for sealing the bearing portion and the shaft and including a through-hole through which the shaft loosely extends and forming a gap with the shaft smaller than a gap formed between the bearing portion and the shaft, wherein one side of the sealing member is biased by a biasing member provided on the other side of the sealing member and pressed against a sealing face formed on a side of the bearing portion close to the outside of the turbine housing; and
    a first bottomed cylinder member including a first bottom portion through which the shaft loosely extends and a first cylinder portion which is formed on an outer periphery of the first bottom portion and accommodates therein a sealing portion at which the sealing member and the sealing face are pressed against each other.

2. An exhaust gas sealing system according to claim 1, further comprising a second bottomed cylinder member provided between the first bottomed cylinder member and the biasing member, and including a second bottom portion through which the shaft loosely extends and a second cylinder portion which is formed on an outer periphery of the second bottom portion and accommodates therein the biasing member.

3. An exhaust gas sealing system according to claim 1, further comprising an arm portion for holding the control valve and disposed between the bearing portion and a bearing portion which supports the one end of the shaft, wherein the movement of the shaft is prohibited in an axial direction thereof.

* * * * *